United States Patent
Ghaida et al.

(10) Patent No.: US 8,869,077 B1
(45) Date of Patent: Oct. 21, 2014

(54) SELECTION OF REPLACEMENT PATTERNS FOR REDUCING MANUFACTURING HOTSPOTS AND CONSTRAINT VIOLATIONS OF IC DESIGNS

(71) Applicant: GLOBALFOUNDRIES Inc., Grand Cayman (KY)

(72) Inventors: Rani Ghaida, San Jose, CA (US); Swamy Muddu, Milpitas, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/901,164

(22) Filed: May 23, 2013

(51) Int. Cl.
G06F 17/50 (2006.01)

(52) U.S. Cl.
CPC ................ *G06F 17/5081* (2013.01)
USPC ................ 716/52; 716/51; 716/55

(58) Field of Classification Search
USPC ................ 716/51–52, 55
See application file for complete search history.

(56) References Cited

U.S. PATENT DOCUMENTS

| | | | |
|---|---|---|---|
| 6,560,766 B2 * | 5/2003 | Pierrat et al. | 716/53 |
| 6,578,188 B1 * | 6/2003 | Pang et al. | 716/52 |
| 7,194,704 B2 * | 3/2007 | Kotani et al. | 716/52 |
| 7,280,945 B1 * | 10/2007 | Weiner et al. | 703/2 |
| 7,523,437 B2 * | 4/2009 | Kyoh et al. | 716/50 |
| 7,752,581 B2 * | 7/2010 | Lanzerotti et al. | 716/52 |
| 7,805,692 B2 * | 9/2010 | Jeng | 716/122 |
| 7,904,845 B2 * | 3/2011 | Fouquet et al. | 716/136 |
| 7,917,871 B2 * | 3/2011 | Kobayashi et al. | 716/51 |
| 8,230,379 B2 * | 7/2012 | Kobayashi et al. | 716/132 |
| 8,347,239 B2 * | 1/2013 | Miloslavsky et al. | 716/52 |
| 8,443,310 B2 * | 5/2013 | Kajiwara et al. | 716/54 |
| 2006/0161452 A1 * | 7/2006 | Hess | 705/1 |
| 2008/0005704 A1 * | 1/2008 | Miloslavsky et al. | 716/2 |
| 2008/0098341 A1 * | 4/2008 | Kobayashi et al. | 716/9 |
| 2013/0007684 A1 * | 1/2013 | Kramer et al. | 716/112 |

OTHER PUBLICATIONS

Swamy Muddu, "Regularization of Layout Patterns in Integrated Circuits," U.S. Appl. No. 13/757,218, filed Feb. 1, 2013.

* cited by examiner

*Primary Examiner* — Naum Levin
(74) *Attorney, Agent, or Firm* — Ditthavong & Steiner, P.C.

(57) ABSTRACT

Methodologies and an apparatus enabling an improvement of a manufacturing yield of an IC design are disclosed. Embodiments include: determining a portion of a layout of an IC design, the portion including a first pattern including a plurality of design connections; determining a function performed by the first pattern based, at least in part, on the design connections; and selecting, by a processor, a second pattern based on the function.

18 Claims, 8 Drawing Sheets

SELECTION OF REPLACEMENT PATTERNS FOR REDUCING MANUFACTURING HOTSPOTS AND CONSTRAINT VIOLATIONS OF IC DESIGNS

TECHNICAL FIELD

The present disclosure relates to manufacture of semiconductor devices. The present disclosure is particularly applicable to a modification of integrated circuit (IC) designs during a design stage for meeting manufacturing constraints and to improve manufacturing yield of a resulting IC.

BACKGROUND

In fabrication of semiconductor devices, traditional methods attempting to improve manufacturing yield of an IC design include manual modifications and automated engineering change orders. However, manual modification by an engineer is expensive, slow, and impractical, particularly in large designs having a large number of design improvements to implement. Furthermore, automated engineering change order (ECO) methods are not always feasible, and are frequently invasive. For instance, automated engineering change order methods frequently rip-up one or more nets to improve a manufacturing yield of an IC design and re-route them. However, such rip-up and re-route techniques frequently displace standard-cells, which may cause a degradation in manufacturing yield. Furthermore, such rip-up and re-route techniques modify large portions of an IC design and thus may never converge to a feasible solution and may negatively impact timing and signal integrity of a resulting design, thereby requiring further manual modifications.

A need therefore exists for a methodology enabling an automated improvement of a manufacturing yield of an IC design without a rip-up and re-route of an entire net, and an apparatus for performing the method.

SUMMARY

An aspect of the present disclosure is a method of improving a manufacturing yield of an IC design by, inter alia, determining a function performed by a pattern of an IC design for replacing the pattern.

Another aspect of the present disclosure is an apparatus configured to improve a manufacturing yield of an IC design by, inter alia, determining a function performed by a pattern (e.g., nets within a portion of an IC design).

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: determining a portion of a layout of an IC design, the portion including a first pattern including a plurality of design connections; determining a function performed by the first pattern based, at least in part, on the design connections; and selecting, by a processor, a second pattern based on the function.

Aspects include replacing the first pattern with the second pattern in the IC design. Further aspects include mapping the design connections to a coordinate system, wherein the determination of the function is further based on the mapping. Additional aspects include associating each of the design connections with one or more nets of the first pattern, wherein the determination of the function is further based on the association. Some aspects include comparing the layout to one or more design constraints, wherein the determination of the portion is based on the comparison and the design constraint is based on at least one of the following: a design rule check of the IC design; an optical rule check of a resulting IC of the IC design; a physical verification of the resulting design; a lithography and/or printability simulation of the IC design; an inspection on a wafer including the resulting IC; and a comparison of the IC design with one or more forbidden patterns and/or layout configurations. Additional aspects include: removing the first pattern from the portion; generating the second pattern to perform the function within the portion; and comparing the layout with the second pattern to the one or more design constraints, wherein the second pattern is selected based on the comparison of the layout with the second pattern to the one or more design constraints. Further aspects include determining a manufacturability of a resulting IC corresponding to the IC design, wherein the determination of the portion is based on the manufacturability. Additional aspects include: determining a polygon indicating a region of the portion to be separated from one or more nets of the first pattern; and determining whether the second pattern has a route within the indicated region, wherein the selection of the second pattern is further based on the determination of whether the second pattern has a route within the indicated region. Some aspects include: determining a plurality of predetermined patterns including the second pattern, each of the predetermined patterns being associated with the function; and determining a metric for each of the predetermined patterns, the metric indicating a manufacturability of each respective predetermined pattern and/or a yield of a resulting IC for each respective predetermined pattern, wherein the selection of the second pattern is further based on the metrics.

Another aspect of the present disclosure is an apparatus including: at least one processor; and at least one memory including computer program code for one or more programs, the at least one memory and the computer program code configured to, with the at least one processor, cause the apparatus to perform at least the following, determine a portion of a layout of an IC design, the portion including a first pattern including a plurality of design connections; determine a function performed by the first pattern based, at least in part, on the design connections; and select a second pattern based on the function.

Some aspects include an apparatus further caused to replace the first pattern with the second pattern in the IC design. Further aspects include an apparatus further caused to map the design connections to a coordinate system, wherein the determination of the function is further based on the mapping. Additional aspects include an apparatus further caused to associate each of the design connections with one or more nets of the first pattern, wherein the determination of the function is further based on the association. Some aspects include an apparatus further caused to compare the layout to one or more design constraints, wherein the determination of the portion is based on the comparison and the design constraint is based on at least one of the following: a design rule check of the IC design; an optical rule check of a resulting IC of the IC design; a physical verification of the resulting design; a lithography and/or printability simulation of the IC design; an inspection on a wafer including the resulting IC; and a comparison of the IC design with one or more forbidden patterns and/or layout configurations. Additional aspects include an apparatus further caused to: remove the first pattern from the portion; generate the second pattern to perform the function within the portion; and compare the layout with the second pattern to the one or more design constraints, wherein the second pattern is selected based on the comparison of the layout with the second pattern to the one or more design constraints. Further aspects include an apparatus further caused to determine a manufacturability of a resulting IC corresponding to the IC design, wherein the determination of the portion is based on the manufacturability. Additional aspects include an apparatus further caused to: determine a polygon indicating a region of the portion to be separated from one or more nets of the first pattern; and determine whether the second pattern has a route within the indicated region, wherein the selection of the second pattern is further based on the determination of whether the second pattern has a route within the indicated region. Further aspects include an apparatus further caused to: determine a plurality of predetermined patterns including the second pattern, each of the predetermined patterns being associated with the function; and determine a metric for each of the predetermined patterns, the metric indicating a manufacturability of each respective predetermined pattern and/or a yield of a resulting IC for each respective predetermined pattern, wherein the selection of the second pattern is further based on the metrics.

Another aspect of the present disclosure is a method including: determining a portion of a layout of an IC design, the portion including a first pattern including a plurality of design connections; mapping the design connections to a coordinate system; associating each of the design connections with one or more nets of the first pattern; determining a function performed by the first pattern based, at least in part, on the mapping and the association of the design connections with the one or more nets; selecting a second pattern based on the function; and replacing, by a processor, the first pattern with the second pattern in the IC design.

Some aspects include: comparing the layout to one or more design constraints, wherein the determination of the portion is based on the comparison and the design constraint is based on at least one of the following: a design rule check of the IC design; an optical rule check of a resulting IC of the IC design; a physical verification of the resulting design; a lithography and/or printability simulation of the IC design; an inspection on a wafer including the resulting IC; a comparison of the IC design with one or more forbidden patterns and/or layout configurations; and determining a manufacturability of a resulting IC corresponding to the IC design; and comparing, after replacement of the first pattern with the second pattern, the layout to the one or more design constraints. Further aspects include: determining a polygon indicating a region of the portion to be separated from the one or more routes of the first pattern, the polygon being based on a design rule check of the IC design; and determining whether the second pattern has a route within the indicated region, wherein the selection of the second pattern is further based on the determination of whether the second pattern has a route within the indicated region. Additional aspects include: determining a plurality of predetermined patterns including the second pattern, each of the predetermined patterns being associated with the function; and determining a metric for each of the predetermined patterns, the metric indicating a manufacturability of each respective predetermined pattern and/or a yield of a resulting IC for each respective predetermined pattern, wherein the selection of the second pattern is further based on the metrics.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problems of time, expense, and impracticability attendant upon implementing manual modifications and ECO methods for improving a manufacturability of an IC design, particularly in large IC designs having many design constraints. In accordance with embodiments of the present disclosure, the problems are solved, for instance by, inter alia, determining a function performed by a pattern (e.g., a portion of one or more routes or nets) of an IC design for replacing the pattern.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
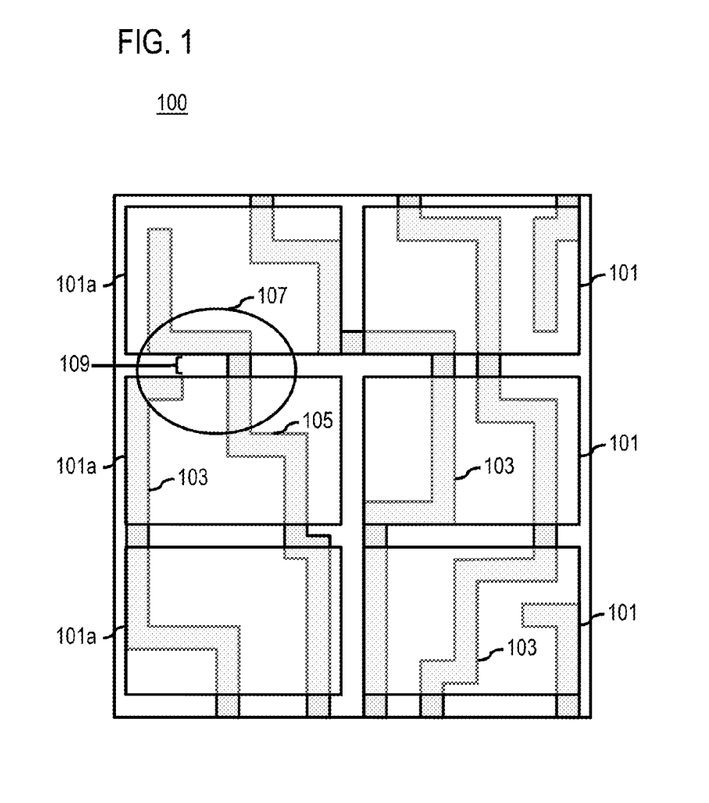
FIGS. 1 and 2 schematically illustrate routes and patterns of an IC design, in accordance with an exemplary embodiment.
Figure 2:
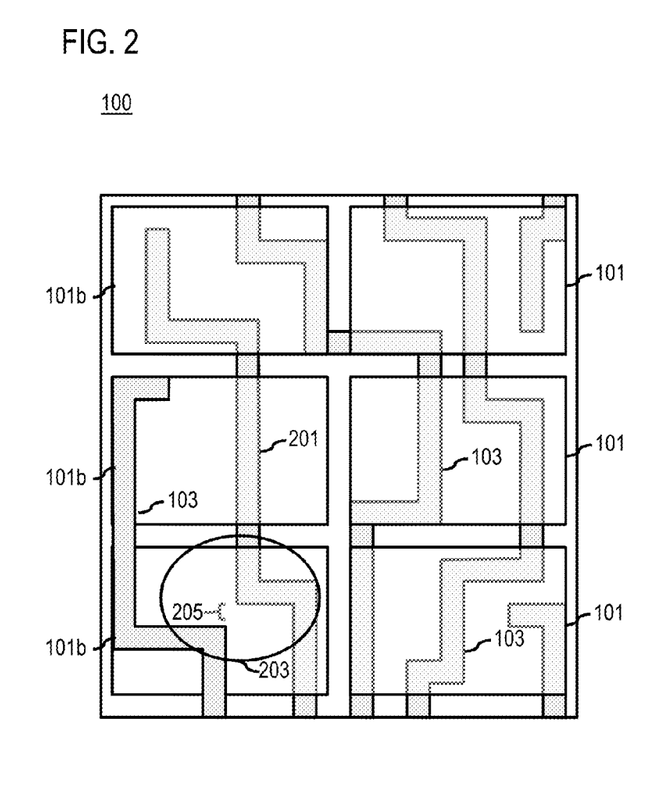

FIGS. 1 and 2 schematically illustrate routes and patterns of an IC design, in accordance with an exemplary embodiment. FIGS. 1 and 2 include an IC design 100 having standard cells 101 connected by nets (e.g., routes) 103 and 105. Adverting to FIG. 1, a portion 107 of nets 103 and 105 (e.g., a pattern) is non-compliant due to a small separation distance 109 resulting in, for example, a reduction in manufacturing yield for the IC design 100. It is noted that the exemplary nets 101 may be significantly larger and span numerous standard cells (e.g., 101). As illustrated in FIG. 2, traditional automated methods rip-up (e.g., remove) net 105 and re-route (e.g., insert) net 201 to attempt to improve the manufacturing yield and/or to comply with design constraints. However, such a rip-up and re-routing, as shown, modifies other patterns associated with nets 105 and 201. For instance, portion 203 is non-compliant after insertion of net 201 due to a small separation distance 205, thereby causing another a reduction in manufacturing yield for the IC design 100 and/or violations of a design constraint. Furthermore, some traditional methods displace cells, for instance, standard cells 101a of FIG. 1, resulting in cells 101b.

Figure 3:
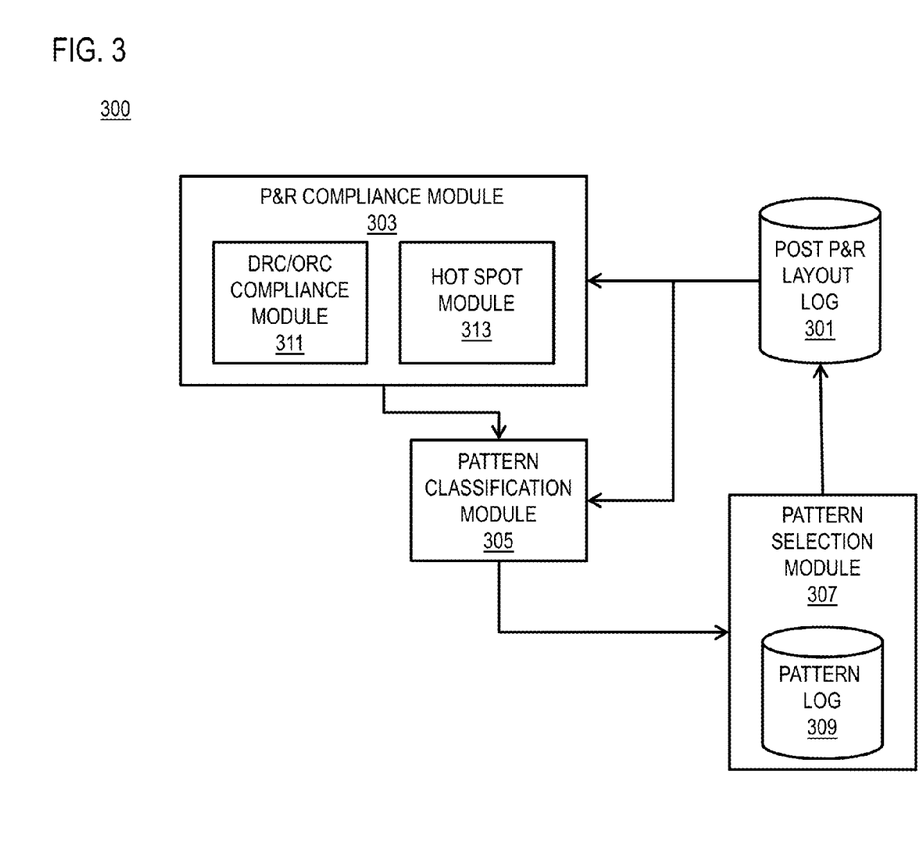
FIG. 3 illustrates a system for improving a manufacturing yield of an IC design, according to an exemplary embodiment.

FIG. 3 illustrates a system for improving a manufacturing yield of an IC design, according to an exemplary embodiment. As shown, a system 300 includes a post P&R layout log 301, P&R compliance module 303, pattern classification module 305, and pattern selection module 307 having pattern log 309. Modules 303, 305, and 307 may be combined.

P&R compliance module 303 is configured to determine compliance and manufacturing hotspots of an IC design layout retrieved from layout log 301. As shown, the compliance module 303 includes a DRC/ORC compliance module 311 and a hotspot module 313.

DRC/ORC compliance module 311 is configured to perform the following: a design rule check of the IC design; an optical rule check of a resulting IC of the IC design; a physical verification of the resulting design; a lithography and/or printability simulation of the IC design; an inspection on a wafer including the resulting IC; and a comparison of the IC design with one or more forbidden patterns and/or layout configurations. Such compliance checks may be performed using traditional methods, for instance, a PROLITH tool. Compliance module 311 may be configured to determine a portion (or first pattern) of a layout that is non-compliant and to subsequently verify that a modified portion (e.g., a second pattern) is compliant.

Hotspot module 313 is configured to determine a manufacturability of a resulting IC corresponding to the IC design to identify hotspot portions of the IC design. For example, hotspot module 313 monitors or facilitates an inspection of resulting ICs of the IC design to determine a portion of the IC design causing at least a specific number or percentage of manufacturing defects impacting yield of the IC design. As such, hotspot module 313 may identify portions of the IC design that are highly susceptible to manufacturing defects, thereby allowing for hotspot reduction/elimination methods important to increase yield of the IC design. Additionally, the compliance module 303 may be configured to determine a polygon indicating a region of the portion to be separated from one or more routes of a pattern of the IC design. For instance, the compliance module 303 determines a pattern to be non-compliant due to its position within a region of the IC design, and indicates the region by an insertion of a polygon into the region. In one example, the region is determined based on a net or route outside of the portion of the IC design, for instance, a net positioned near an edge of an adjacent portion or pattern of the IC design. Hotspot module 313 may be configured to determine a portion of a layout that is a hotspot and to subsequently verify that a modified portion is not a hotspot.

Pattern classification module 305 is configured to determine a function of a portion or pattern of a layout of layout log 301. For instance, classification module 305 receives an indication of a portion of the IC design, retrieves the portion from the layout log 301, and transmits a function of the portion to the pattern selection module 307. In one example, patterns having identical functions may replace one another without affecting design connectivity of the IC design. Furthermore, classification module 305 may be configured to map one or more design connections to a coordinate system. For instance, the classification module 305 generates a numerical representation of a pattern function within the portion of the IC design. Additionally, the classification module 305 may be configured to determine a portion of the IC design to be separate from routes or nets of a pattern of the IC design. For instance, the classification module 305 retrieves a polygon indicating a region of the IC design from the compliance module 303 and includes the polygon in the (mapped) function transmitted to the selection module 307.

Pattern selection module 307 is configured to select a pattern based on a function. For instance, selection module 307 receives a function from classification module 305, selects a pattern from pattern log 309 that complies with the function, and modifies a layout in layout log 301. Additionally, selection module 307 may be configured to maintain patterns of log 309. For instance, the selection module 307 may determine a metric for each of the patterns of log 309 based on a manufacturability of each respective predetermined pattern and/or a yield of a resulting IC for each respective predetermined pattern. In one example, a highest (or lowest) metric represents a safest error margin for fabrication of a resulting IC circuit. Furthermore, selection module 307 may select a pattern based on the function and the metric. For instance, selection module 307 may determine a plurality of patterns that perform an indicated function (and having a region/polygon separated from one or more routes of a pattern) and select a pattern having a highest (or lowest) metric value. As such, manufacturability of an IC design may be further increased by selecting patterns having improved manufacturing properties.

Figure 4:
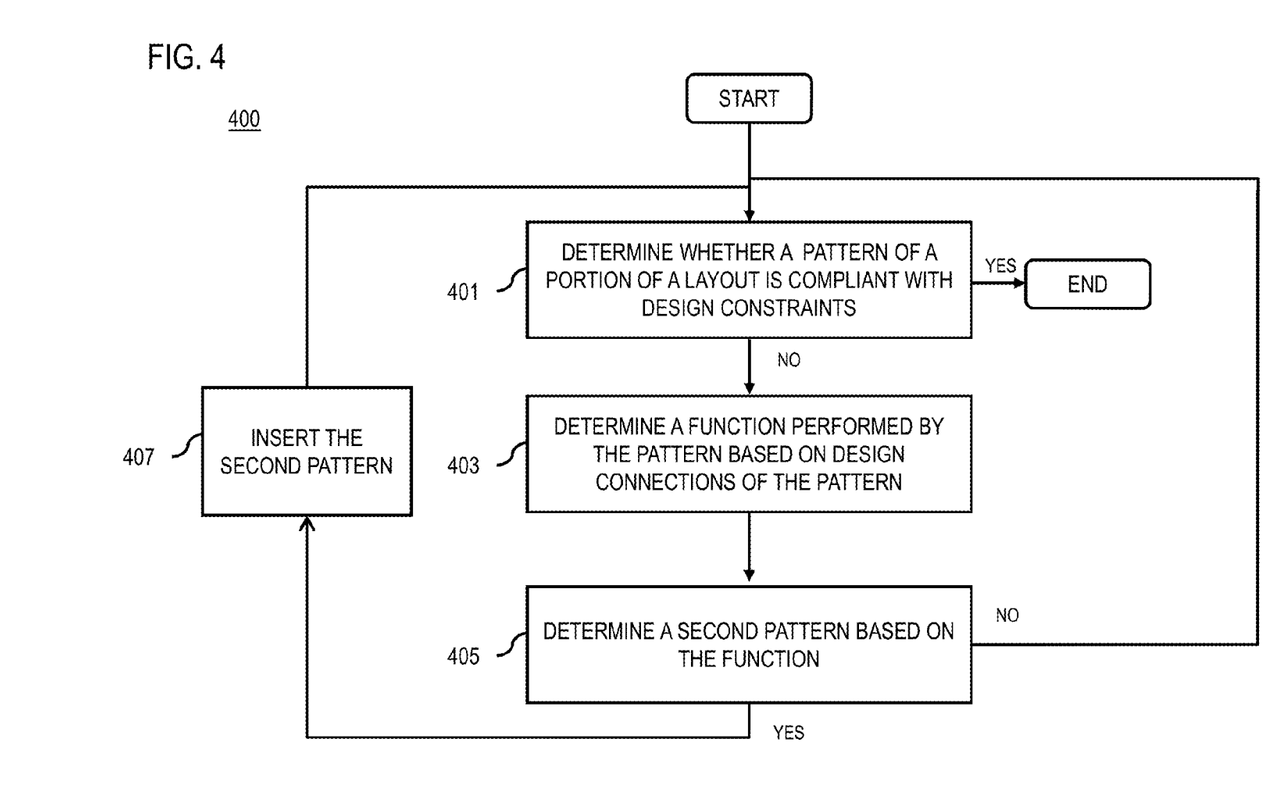
FIG. 4 is a flowchart of a process for improving a manufacturing yield of an IC design, according to an exemplary embodiment.

FIG. 4 is a flowchart of a process for improving a manufacturing yield of an IC design, according to an exemplary embodiment. For illustrative purposes, process 400 is described with respect to the system of FIG. 3 and the exemplary illustrations of FIGS. 5 through 9. It is noted that the steps of process 400 may be performed in any suitable order, as well as combined or separated in any suitable manner.

Figure 5:
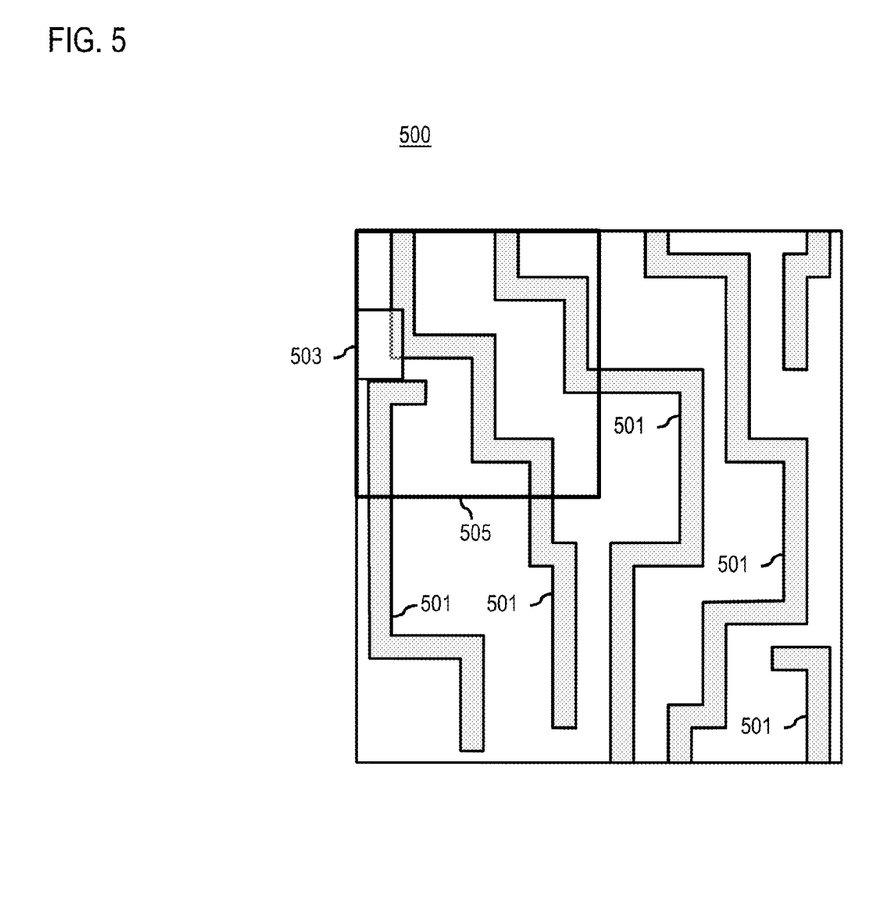
FIGS. 5 through 9 schematically illustrate a process for improving a manufacturing yield of an IC design, in accordance with an exemplary embodiment.

In step 401, compliance module 303 determines whether a pattern of a portion of a layout is compliant with design constraints. For instance, the compliance module 303 determines whether each of the routes 501 of IC design 500 of FIG. 5, are compliant with design rules and are separated from a forbidden region 503. As shown, the compliance module 303 indicates a portion 505 of the IC design as a hotspot and/or as non-compliant with design rules. It is contemplated that portions may be various shapes and sizes, for instance, circular, rectangular, etc. If the compliance module 303 determines the IC design to be compliant and/or have no hotspots then the process ends, otherwise the process continues to step 403.

Figure 6:
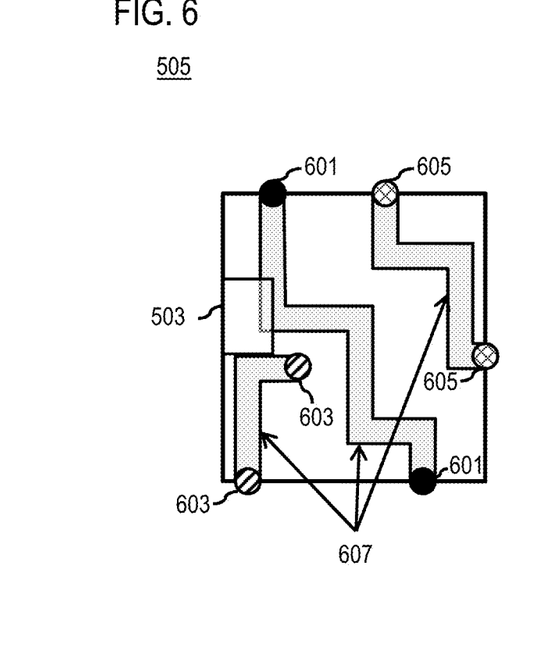
Figure 7:
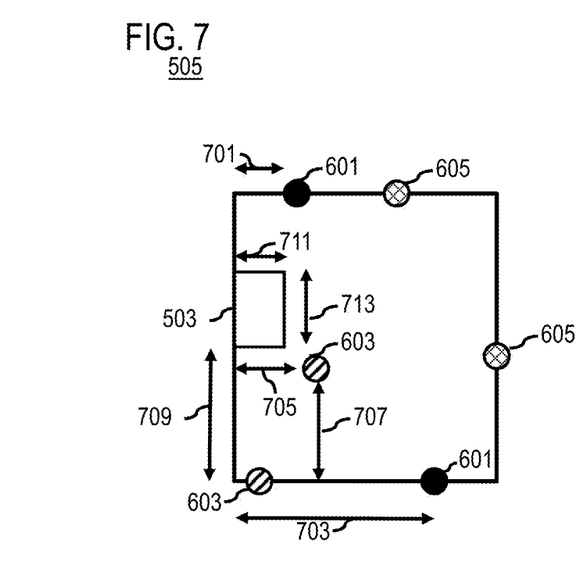
Figure 8A:
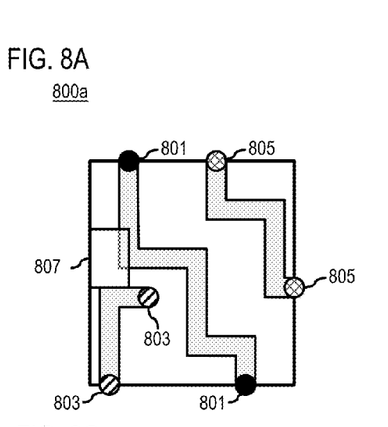
Figure 8B:
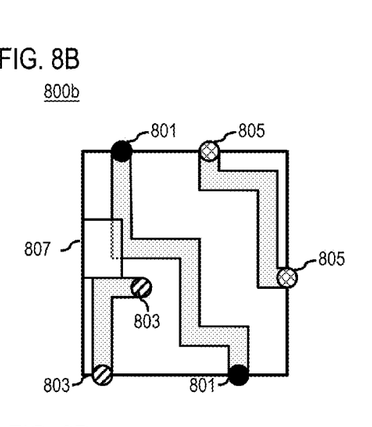
Figure 8C:
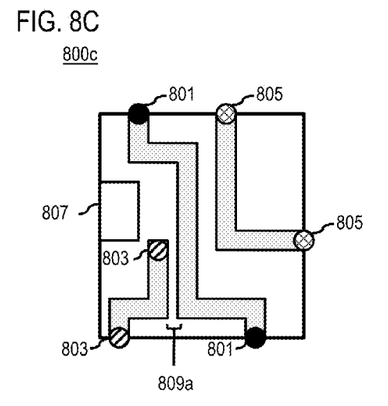
Figure 8D:
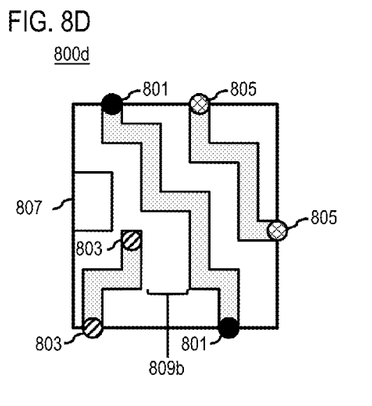

Next, the classification module 305 determines, as in step 403, a function performed by the pattern based on design connections of the pattern. For instance, and as shown in FIG. 6, the classification module 305 determines design point sets 601, 603, and 605 of pattern 607 corresponding to the routes 501 in the portion 505. Adverting to FIG. 7, the classification module 305 ignores pattern 607 and numerically maps a function performed by each of the design point sets 601, 603, and 605 on a coordinate system having an origin on the lower left corner of the portion 505. For instance, design point set 601 has a design point on the top edge of portion 505 separated from the left edge by a distance 701 (e.g., 30) having a width (e.g., 20) and another design point on the bottom edge of portion 505 separated from the left edge by a distance 703 (e.g., 100) having a width (e.g., 20). As such, the classification module 305 may generate the following code:

top 30 bot 100 20 20 # side dist side dist width width

Additionally, the classification module 305 may map design points positioned within portion 505 and separated from the edges of portion 505. For instance, as shown, design point set 603 has a design point on the bottom edge of portion 505 separated from the left edge by a distance (e.g., 5) having a width (e.g., 20) and another design point separated from the left edge of portion 505 by a distance 705 (e.g., 30) and from the bottom edge of portion 505 by a distance 707 (e.g., 90) having a width (e.g., 20). As such, the classification module 305 may generate the following code:

bot 5 within 30 90 20 # side dist inside ΔX ΔY width

As such, in the example, the classification module 305 generates the following code to map the function of portion 505:

top 30 bot 100 20 20 # side dist side dist width width
    top 70 right 100 20 20 # side dist side dist width width
    bot 5 within 30 90 20 # side dist inside ΔX ΔY width In some embodiments, the classification module 305 may initiate an indexing of the code to map the function of portion 505, for instance, by sending the code to pattern selection module 307 and/or storing the code in pattern log 309.

Furthermore, the classification module 305 may specify a manufacturing constraint with a surrounding area. For instance, as shown, forbidden region 503 of portion 505 is positioned on the left edge of the portion 505 separated from the bottom edge by a distance 709 (e.g., 100) having a width 711 (e.g., 30) and a depth 713 (e.g., 50). As such, the classification module 305 may generate the following code:

vleft 100 30 50 # viol_side dist width depth

Figure 9:
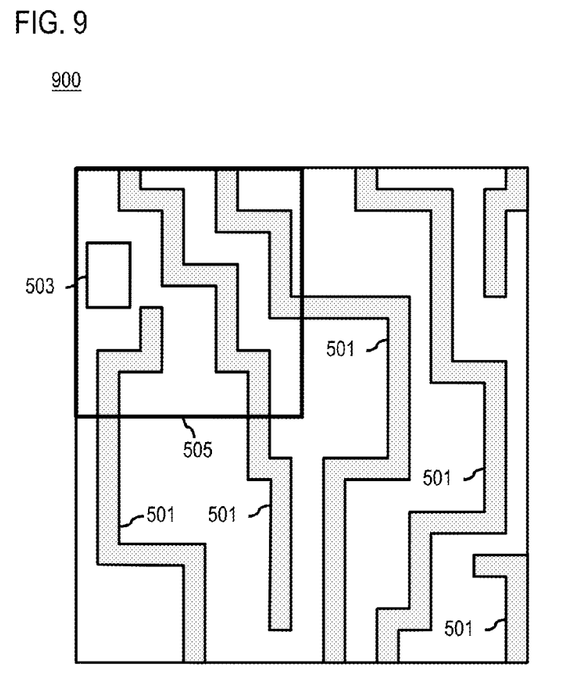

Therefore, in the example, the classification module 305 generates the following code to map portion 505 for replacement by another pattern:

top 30 bot 100 20 20 # side dist side dist width width
    top 70 right 100 20 20 # side dist side dist width width
    bot 5 within 30 90 20 # side dist inside ΔX ΔY width
    vleft 100 30 50 # viol_side dist width depth Next, in step, 405, the selection module 307, determines a second pattern based on the function. For instance, selection module 307 determines patterns 800a, 800b, 800c, and 800d to perform a function identified by the classification module 305 based on the above-identified code to map the function. As illustrated, FIGS. 8A, 8B, 8C, and 8D each include design point sets 801, 803, and 805, and forbidden region 807 and provide the function (e.g., are replaceable by each other). As such, the selection module 307 may be configured select patterns 800c and 800d over patterns 800a and 800b because forbidden region 807 is not separated (e.g., not compliant) from patterns 800a and 800b. Furthermore, the selection module 307 may be configured select pattern 800d over pattern 800c because separation distance 809a is less than separation distance 809b, resulting in an improved manufacturing yield of pattern 800d over 800c. In one example, patterns 800a, 800b, 800c, and 800d are each assigned a metric score indicating a manufacturing yield, such as, 70, 90, 50, and 85, respectively. As such, the selection module 307 inserts, as in step 407, a pattern (e.g., pattern 800d). For example, the selection module 307 inserts pattern 800d because it is separated from forbidden region 807 and has the best (e.g., highest) metric score. Additionally, if no pattern performing the function and being separated from forbidden region 807 is found, the selection module 307 may remove the pattern (e.g., 800a) from portion 505 and re-generate routing solutions within the portion 505 until a pattern is manufacturable and/or a hotspot is removed. In some instances, if no pattern performing the function and being separated from forbidden region 807 is found (and no re-generate routing solution exists), the process initiates a manual fixing and/or ends. Furthermore, the compliance module 303 may verify that a replacement pattern (e.g., patter 800d) is compliant (and not a hotspot). As shown in FIG. 9, the IC design 900 includes the pattern 800d, is compliant, and has routes 501 separated from the forbidden region 503 without using a rip-and re-route process. As such, standard cells (e.g., 101) of the design are not disrupted, for instance, portions outside of the portion 505 are not impacted by changes to patterns within portion 505.

Figure 10:
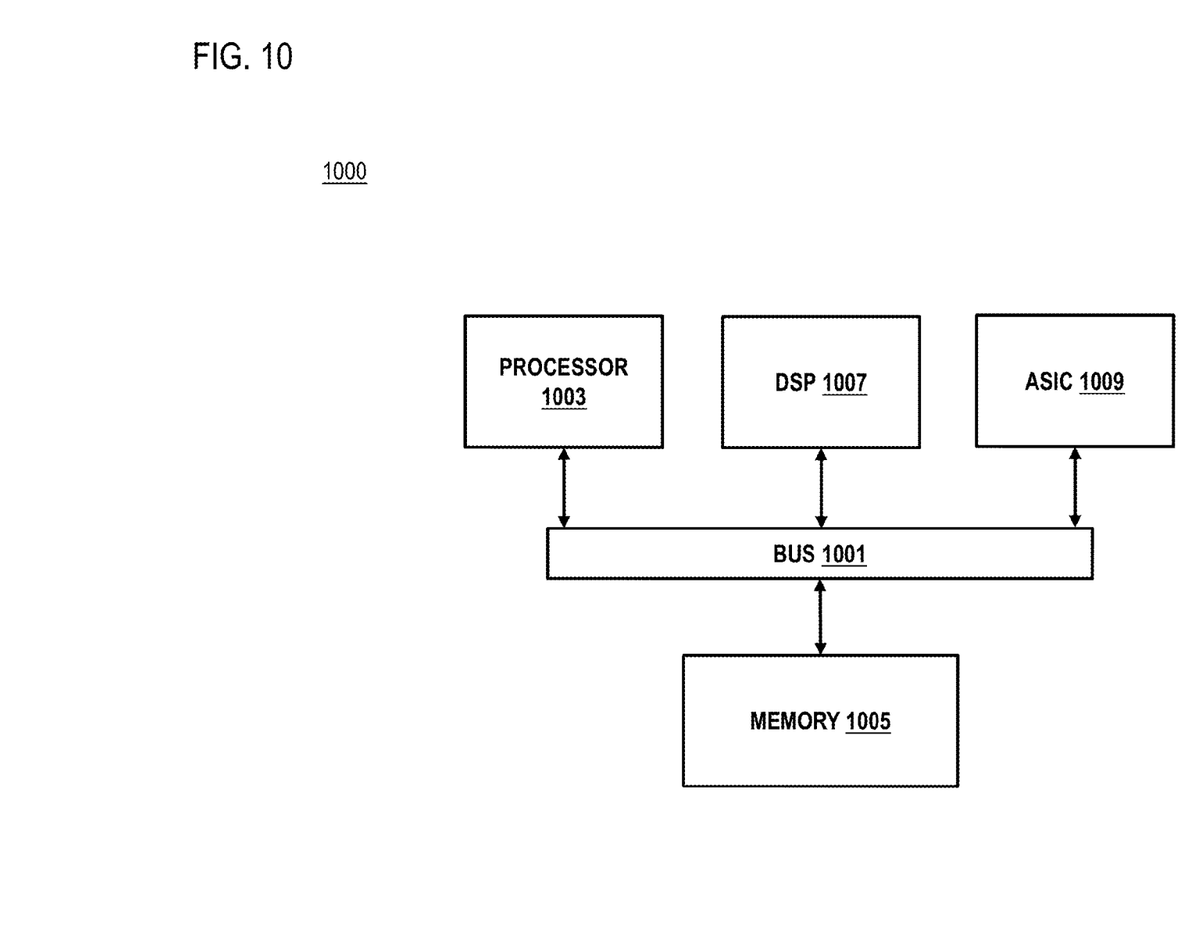
FIG. 10 illustrates a diagram of a chip set that can be used to implement exemplary embodiments.

FIG. 10 is a diagram of a chip set that can be used to implement various exemplary embodiments. Chip set 1000 is programmed to improve a manufacturing yield of an IC design as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in exemplary embodiments the chip set can be implemented in a single chip. Chip set 1000, or a portion thereof, constitutes a means for performing one or more steps of FIGS. 1 through 9.

The chip set 1000 may include a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied by one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein. The memory 1005 also stores the data associated with or generated by the execution of the inventive steps.

The embodiments of the present disclosure can achieve several technical effects, including an improvement in manufacturing yield of an IC design. The present disclosure enjoys industrial applicability in any of various types of highly integrated semiconductor devices, particularly large IC designs having numerous design constraints.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   determining a portion of a layout of an integrated circuit (IC) design, the portion comprising a first pattern including a plurality of design point sets;
   generating a code based, at least in part, on at least one distance of at least one of the plurality of design point sets from at least one location within the portion;
   mapping at least one of the plurality of design point sets to a coordinate system in accordance with the code;
   associating the at least one of the plurality of design point sets with one or more nets of the first pattern;
   determining, based on the mapping and association, a function performed by the first pattern based, at least in part, on the at least one of the plurality of design point sets; and
   selecting, by a processor, a second pattern based on the function.

2. The method according to claim 1, comprising:
   replacing the first pattern with the second pattern in the IC design.

3. The method according to claim 1, comprising:
   comparing the layout to one or more design constraints, wherein the determination of the portion is based on the comparison and the design constraint is based on at least one of the following:
   a design rule check of the IC design;
   an optical rule check of a resulting IC of the IC design;
   a physical verification of the resulting design;
   a lithography and/or printability simulation of the IC design;
   an inspection on a wafer comprising the resulting IC; and
   a comparison of the IC design with one or more forbidden patterns and/or layout configurations.

4. The method according to claim 3, comprising:
   removing the first pattern from the portion;
   generating the second pattern to perform the function within the portion; and
   comparing the layout with the second pattern to the one or more design constraints, wherein the second pattern is selected based on the comparison of the layout with the second pattern to the one or more design constraints.

5. The method according to claim 1, comprising:
   determining a manufacturability of a resulting IC corresponding to the IC design, wherein the determination of the portion is based on the manufacturability.

6. The method according to claim 1, comprising:
   determining a polygon indicating a region of the portion to be separated from one or more nets of the first pattern; and
   determining whether the second pattern has a route within the indicated region, wherein the selection of the second pattern is further based on the determination of whether the second pattern has a route within the indicated region.

7. The method according to claim 1, comprising:
   determining a plurality of predetermined patterns including the second pattern, each of the predetermined patterns being associated with the function; and
   determining a metric for each of the predetermined patterns, the metric indicating manufacturability of each respective predetermined pattern and/or a yield of a resulting IC for each respective predetermined pattern, wherein the selection of the second pattern is further based on the metrics.

8. An apparatus comprising:
   at least one processor; and
   at least one memory including computer program code for one or more programs,
   the at least one memory and the computer program code configured to, with the at least one processor, cause the apparatus to perform at least the following,
   determine a portion of a layout of an integrated circuit (IC) design, the portion comprising a first pattern including a plurality of design point sets;
   generate a code based, at least in part, on at least one distance of at least one of the plurality of design point sets from at least one location within the portion;
   map at least one of the plurality of design point sets to a coordinate system in accordance with the code;
   associating the at least one of the plurality of design point sets with one or more nets of the first pattern;
   determine, based on the mapping and association, a function performed by the first pattern based, at least in part, on the at least one of the plurality of design point sets; and
   select a second pattern based on the function.

9. The apparatus according to claim 8, wherein the apparatus is further caused to:
   replace the first pattern with the second pattern in the IC design.

10. The apparatus according to claim 8, wherein the apparatus is further caused to:
    compare the layout to one or more design constraints, wherein the determination of the portion is based on the comparison and the design constraint is based on at least one of the following:
    a design rule check of the IC design;
    an optical rule check of a resulting IC of the IC design;
    a physical verification of the resulting design;
    a lithography and/or printability simulation of the IC design; an inspection on a wafer comprising the resulting IC; and
    a comparison of the IC design with one or more forbidden patterns and/or layout configurations.

11. The apparatus according to claim 10, wherein the apparatus is further caused to:
    remove the first pattern from the portion;
    generate the second pattern to perform the function within the portion; and
    compare the layout with the second pattern to the one or more design constraints, wherein the second pattern is selected based on the comparison of the layout with the second pattern to the one or more design constraints.

12. The apparatus according to claim 8, wherein the apparatus is further caused to:
    determine a manufacturability of a resulting IC corresponding to the IC design, wherein the determination of the portion is based on the manufacturability.

13. The apparatus according to claim 8, wherein the apparatus is further caused to:
   determine a polygon indicating a region of the portion to be separated from one or more nets of the first pattern; and
   determine whether the second pattern has a route within the indicated region, wherein the selection of the second pattern is further based on the determination of whether the second pattern has a route within the indicated region.

14. The apparatus according to claim 8, wherein the apparatus is further caused to:
   determine a plurality of predetermined patterns including the second pattern, each of the predetermined patterns being associated with the function; and
   determine a metric for each of the predetermined patterns, the metric indicating a manufacturability of each respective predetermined pattern and/or a yield of a resulting IC for each respective predetermined pattern, wherein the selection of the second pattern is further based on the metrics.

15. A method comprising:
   determining a portion of a layout of an integrated circuit (IC) design, the portion comprising a first pattern including a plurality of design point sets;
   generating a code based, at least in part, on at least one distance of at least one of the plurality of design point sets from at least one location within the portion;
   mapping at least one of the plurality of design point sets to a coordinate system in accordance with the code;
   associating the at least one of the plurality of the design point sets with one or more routes of the first pattern;
   determining, based on the mapping and association, a function performed by the first pattern based, at least in part, on the mapping and the association of the at least one of the plurality of the design point sets with the one or more routes;
   selecting a second pattern based on the function; and
   replacing, by a processor, the first pattern with the second pattern in the IC design.

16. The method according to claim 15, comprising:
   comparing the layout to one or more design constraints, wherein the determination of the portion is based on the comparison and the design constraint is based on at least one of the following:
   a design rule check of the IC design;
   an optical rule check of a resulting IC of the IC design;
   a physical verification of the resulting design;
   a lithography and/or printability simulation of the IC design;
   an inspection on a wafer comprising the resulting IC;
   a comparison of the IC design with one or more forbidden patterns and/or layout configurations; and
   determining a manufacturability of a resulting IC corresponding to the IC design; and
   comparing, after replacement of the first pattern with the second pattern, the layout to the one or more design constraints.

17. The method according to claim 15, comprising:
   determining a polygon indicating a region of the portion to be separated from the one or more routes of the first pattern, the polygon being based on a design rule check of the IC design; and
   determining whether the second pattern has a route within the indicated region, wherein the selection of the second pattern is further based on the determination of whether the second pattern has a route within the indicated region.

18. The method according to claim 15, comprising:
   determining a plurality of predetermined patterns including the second pattern, each of the predetermined patterns being associated with the function; and
   determining a metric for each of the predetermined patterns, the metric indicating a manufacturability of each respective predetermined pattern and/or a yield of a resulting IC for each respective predetermined pattern, wherein the selection of the second pattern is further based on the metrics.

\* \* \* \* \*